(12) United States Patent
Murphy et al.

(10) Patent No.: US 8,805,953 B2
(45) Date of Patent: Aug. 12, 2014

(54) DIFFERENTIAL FILE AND SYSTEM RESTORES FROM PEERS AND THE CLOUD

(75) Inventors: Elissa E. Murphy, Seattle, WA (US); John D. Mehr, Kenmore, WA (US); Navjot Virk, Bellevue, WA (US); Lara M. Sosnosky, Kirkland, WA (US); James R. Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1017 days.

(21) Appl. No.: 12/417,992

(22) Filed: Apr. 3, 2009

(65) Prior Publication Data

US 2010/0257142 A1 Oct. 7, 2010

(51) Int. Cl.
*G06F 15/16* (2006.01)
*G06F 15/173* (2006.01)
*G06F 7/00* (2006.01)
*G06F 17/00* (2006.01)
*G06F 17/30* (2006.01)
*G06F 11/14* (2006.01)

(52) U.S. Cl.
CPC ........ *G06F 11/1446* (2013.01); *G06F 11/1448* (2013.01); *G06F 11/1451* (2013.01); *G06F 11/1458* (2013.01); *G06F 11/1464* (2013.01); *G06F 11/1469* (2013.01)
USPC ........... 709/217; 709/219; 709/238; 707/610; 707/634; 707/637; 707/638

(58) Field of Classification Search
USPC .......................................... 709/217; 707/681
See application file for complete search history.

(56) References Cited

U.S. PATENT DOCUMENTS

| 4,853,843 A | * | 8/1989 | Ecklund | 1/1 |
| 5,765,173 A | * | 6/1998 | Cane et al. | 707/640 |

(Continued)

FOREIGN PATENT DOCUMENTS

| CN | 1838083 A | 9/2006 |
| JP | 2005301464 A | 10/2005 |
| JP | 2005302004 A | 10/2005 |
| JP | 2009070143 A | 4/2009 |

OTHER PUBLICATIONS

Bindel et al OceanStore: An Extremely Wide-Area Storage System, Report No. UCB/CSD-00-1102, University of California Berkeley (2000).*

(Continued)

*Primary Examiner* — David Lazaro
*Assistant Examiner* — Robert Shaw
(74) *Attorney, Agent, or Firm* — Bryan Webster; Andrew Sanders; Micky Minhas

(57) ABSTRACT

Provided herein are systems and methodologies for highly efficient restoration in a network-based backup system. As described herein, differential-based analysis can be utilized such that a new complete differential is calculated based on signatures and/or other information relating to a given item to be restored prior to retrieving backup data. Based on the differential, only blocks determined to be unique between the current version of the item and the desired version are transmitted, which can then be merged with non-unique locally present blocks to obtain the fully restored version of the item. Further, a hybrid architecture can be employed, wherein signatures and/or data are stored at a global location within a network as well as one or more local peers. Accordingly, a backup client can obtain information necessary for restoration from either the global location or a nearby peer, thus further reducing latency and bandwidth consumption.

20 Claims, 12 Drawing Sheets

(56) References Cited

U.S. PATENT DOCUMENTS

| | | | |
|---|---|---|---|
| 5,794,254 A | | 8/1998 | McClain |
| 6,049,874 A | | 4/2000 | McClain |
| 6,148,412 A | * | 11/2000 | Cannon et al. ............... 714/6.31 |
| 6,367,029 B1 | | 4/2002 | Mayhead |
| 6,658,435 B1 | | 12/2003 | McCall |
| 6,760,840 B1 | * | 7/2004 | Shimbo et al. ................ 713/165 |
| 7,203,711 B2 | | 4/2007 | Borden |
| 7,257,257 B2 | | 8/2007 | Anderson |
| 7,330,997 B1 | * | 2/2008 | Odom ......................... 714/6.23 |
| 7,334,124 B2 | | 2/2008 | Pham |
| 7,447,857 B2 | | 11/2008 | Lyon |
| 7,529,785 B1 | * | 5/2009 | Spertus et al. ......................... 1/1 |
| 7,653,668 B1 | * | 1/2010 | Shelat et al. ................... 707/610 |
| 7,783,600 B1 | * | 8/2010 | Spertus et al. ................. 707/622 |
| 7,873,601 B1 | * | 1/2011 | Kushwah ...................... 707/654 |
| 8,099,572 B1 | * | 1/2012 | Arora et al. .................... 711/162 |
| 8,190,836 B1 | * | 5/2012 | Zheng et al. ................... 711/162 |
| 2002/0073106 A1 | * | 6/2002 | Parker et al. .................. 707/200 |
| 2003/0105810 A1 | * | 6/2003 | McCrory et al. .............. 709/203 |
| 2003/0177176 A1 | * | 9/2003 | Hirschfeld et al. ........... 709/203 |
| 2003/0182313 A1 | * | 9/2003 | Federwisch et al. .......... 707/200 |
| 2003/0204609 A1 | * | 10/2003 | Anderson et al. ............. 709/229 |
| 2004/0088331 A1 | * | 5/2004 | Therrien et al. ............... 707/200 |
| 2004/0210591 A1 | * | 10/2004 | Hirschfeld et al. ........... 707/100 |
| 2004/0267836 A1 | * | 12/2004 | Armangau et al. ........... 707/203 |
| 2005/0015663 A1 | * | 1/2005 | Armangau et al. ............. 714/15 |
| 2005/0097283 A1 | * | 5/2005 | Karlsson et al. .............. 711/159 |
| 2005/0193245 A1 | * | 9/2005 | Hayden et al. .................. 714/13 |
| 2005/0235043 A1 | | 10/2005 | Teodosiu et al. |
| 2005/0240813 A1 | * | 10/2005 | Okada et al. .................... 714/14 |
| 2005/0262097 A1 | * | 11/2005 | Sim-Tang et al. .............. 707/10 |
| 2006/0064416 A1 | * | 3/2006 | Sim-Tang ........................ 707/6 |
| 2006/0149798 A1 | * | 7/2006 | Yamagami .................... 707/204 |
| 2006/0155729 A1 | * | 7/2006 | Aahlad et al. ................. 707/100 |
| 2006/0212439 A1 | | 9/2006 | Field |
| 2006/0230076 A1 | * | 10/2006 | Gounares et al. ............. 707/200 |
| 2007/0100913 A1 | * | 5/2007 | Sumner et al. ................ 707/204 |
| 2007/0136200 A1 | * | 6/2007 | Frank et al. ...................... 705/50 |
| 2007/0177739 A1 | * | 8/2007 | Ganguly et al. .............. 380/277 |
| 2007/0214198 A1 | * | 9/2007 | Fontenot et al. .............. 707/204 |
| 2007/0266062 A1 | | 11/2007 | Young |
| 2007/0294321 A1 | * | 12/2007 | Midgley et al. ............... 707/204 |
| 2008/0104147 A1 | * | 5/2008 | Schwaab et al. .............. 707/204 |
| 2008/0162599 A1 | | 7/2008 | Mittal et al. |
| 2008/0195827 A1 | | 8/2008 | Saiki |
| 2008/0243939 A1 | * | 10/2008 | Kottomtharayil et al. ..... 707/200 |
| 2008/0307347 A1 | * | 12/2008 | Cisler et al. ................... 715/771 |
| 2009/0077134 A1 | | 3/2009 | Ueoka et al. |
| 2009/0276771 A1 | * | 11/2009 | Nickolov et al. ............. 717/177 |
| 2010/0023722 A1 | * | 1/2010 | Tabbara et al. ............... 711/170 |
| 2010/0191783 A1 | * | 7/2010 | Mason et al. ................. 707/822 |

OTHER PUBLICATIONS

Mao et al, QoS Oriented Dynamic Replica Cost Model for P2P Computing, Proceedings of the 25th IEEE International Conference on Distributed Computing Systems Workshops (ICDCSW'05), IEEE 2005.*

Androutellis-Theotokis, A Survey of Peer-to-Peer Content Distribution Technologies, ACM Computing Surveys, vol. 36, No. 4, Dec. 2004.*

Chen et al, A Prototype Implementation of Archival Intermemory, ACM 1999 http://www.hpl.hp.com/personal/Yuan_Chen/paper14.pdf.*

Office Action mailed Apr. 1, 2014 in AU Pat. App. No. 2010232795, 3 pages.

"International Search Report", Mailed Date: Oct. 28, 2010, Application No. PCT/US2010/028957, Filed Date: Mar. 26, 2010, pp. 9.

"Extended European Search Report"; Mailed Oct. 16, 2012; EP App. No. 10759248.07; Application Filed: Sep. 14, 2011; 8 pages.

Office Action mailed Feb. 14, 2014 in RU Pat. App. No. 2011139997, 6 pages, including Concise Explanation of Relevance and/or partial translation.

Office Action mailed Feb. 6, 2014 in JP Patent App. No. 2012-503541, 4 pages, including translation.

Office Action mailed Nov. 20, 2013 in CN Patent App. No. 201080015305.X, 13 pages, including partial translation and concise explanation of relevance.

Joseph Moran, Review: SimpleTech Signature Mini USB 2.0 Portable Drive http://www.smallbusinesscomputing.com/buyersguide/article.php/3747131. Last accessed Jan. 24, 2009, 4 pages.

Cheng, et al., A Service-Oriented Approach to Storage Backup http://ieeexplore.ieee.org/stamp/stamp.jsp?arnumber=04578550. Last accessed Jan. 24, 2009, 9 pages.

Office Action dated Apr. 22, 2014 in EP Pat. App. No. 10759248.7, 5 pages.

* cited by examiner

DIFFERENTIAL FILE AND SYSTEM RESTORES FROM PEERS AND THE CLOUD

BACKGROUND

As computing devices become more prevalent and widely used among the general population, the amount of data generated and utilized by such devices has rapidly increased. For example, recent advancements in computing and data storage technology have enabled even the most limited form-factor devices to store and process large amounts of information for a variety of data-hungry applications such as document editing, media processing, and the like. Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing system and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage, where the respective versions can later be retrieved for restoration. However, a sizeable amount of data is generally transmitted over the network in such an example, thereby consuming expensive bandwidth. In view of the foregoing, it would be desirable to implement network-based backup techniques with improved efficiency.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate highly efficient restoration techniques for network-based backup systems. A differential-based analysis can be utilized such that, for a given restoration of a particular version of an item to be restored, a new complete differential is calculated between one or more remote backup locations and a backup client prior to transmitting data over the network. A differential can be calculated at both the backup client and the remote backup location by, for example, comparing signatures corresponding to a current version of the item to be restored located on the backup client and a desired version located at the remote backup location. Based on the calculated differential, transmission can be conducted for only blocks determined to be unique between the current version of the item and its desired version, thereby reducing the latency of the restore as well as the network bandwidth consumed. Once obtained, unique blocks obtained from a remote backup location can then be merged with non-unique blocks present in the current version of the item already located at the backup client to obtain the fully restored version.

In accordance with one aspect, a hybrid architecture can be employed, wherein signatures and/or data needed to conduct a restore can be made available to a backup client from a global location within a network or internetwork (e.g., a "cloud") as well as from one or more peer machines associated with a machine on which the backup client is located. Accordingly, a backup client can obtain some or all information necessary for carrying out a restore from either the cloud or a nearby peer, thus further reducing latency and bandwidth consumption. In one example, selection of locations to be utilized for storing and/or retrieving backup information can be selected in an intelligent and automated manner based on factors such as availability of network locations, relative loading, network topology, or the like.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
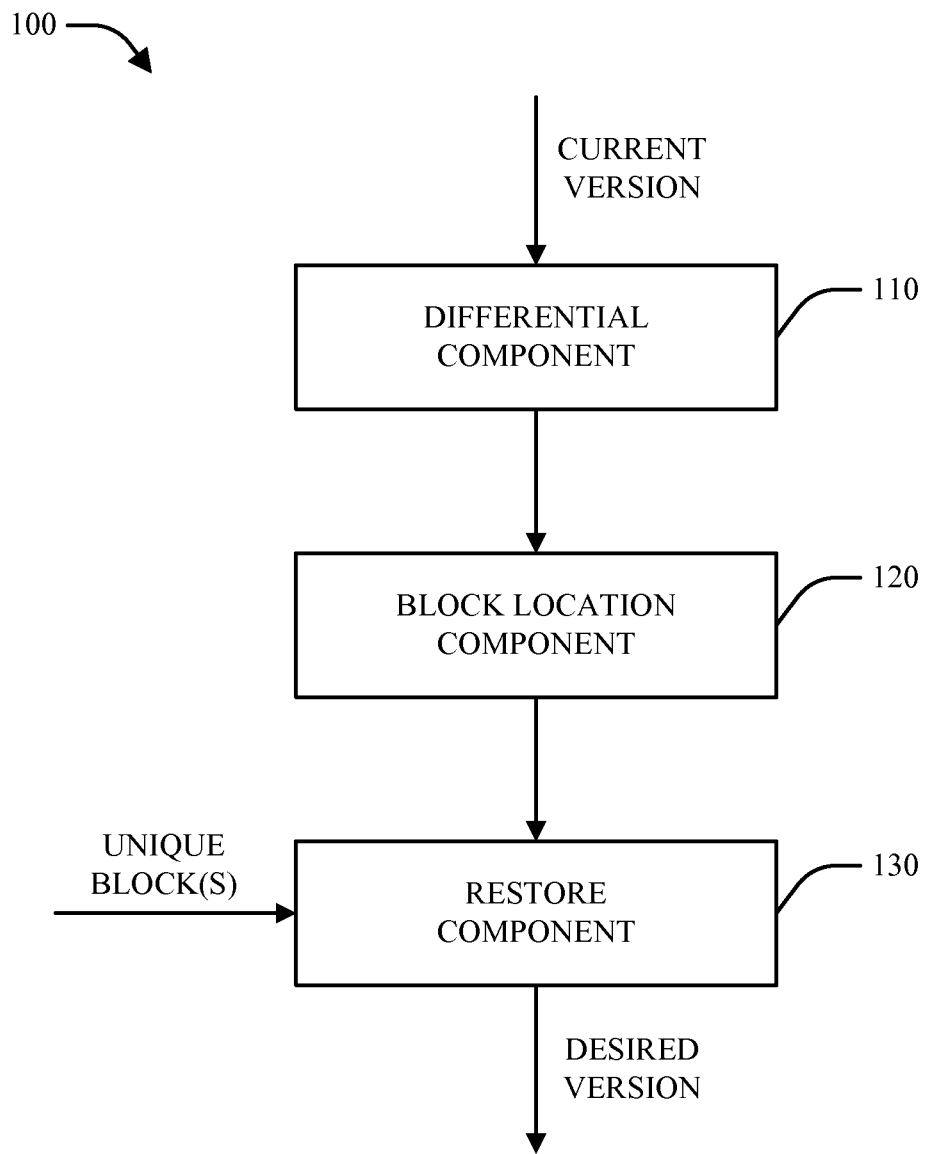
FIG. 1 is a high-level block diagram of a system for conducting a differential restore from backup information in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "schema," "algorithm," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a block diagram of a system 100 for conducting a differential restore from backup information in accordance with various aspects described herein. In one example, system 100 can be utilized to restore files, system images, and/or other data from a current version residing on a client machine that implements and/or is otherwise associated with system 100 to a desired version residing on a backup system.

In accordance with one aspect, system 100 can be utilized in connection with a network-based or online backup solution (e.g., a cloud backup system, as described in further detail infra) that stores backup information from a client machine at one or more remote storage locations on a network or internetwork to which the client machine is associated. Conventional online backup solutions operate by maintaining a set of files obtained from a backup client at various points in time at a remote storage location. Subsequently, restoration is conducted by retrieving one or more files from the storage location as requested. However, it can be appreciated that restoring information from an online backup system in this manner can consume an excessive amount of time and/or bandwidth associated with retrieving complete files from online backup storage. Further, it can be appreciated that such systems generally retrieve complete files for restoration operations, even in cases where, for example, only a small portion of data in a given file has changed between a current version stored at the client and the desired version at the remote location. For example, such systems are in some cases configured to retrieve a complete file even when the current version of the file at the client and the version to be retrieved differ only in name and/or metadata.

Other conventional online backup solutions can provide incremental remote storage by, for example, storing an original version of information and subsequently storing incremental updates reflecting changes to the original version rather than storing multiple complete versions of the information. However, incremental updates are conventionally stored and retrieved in such systems in a cumulative manner, such that a backup client wishing to roll a file or other information back across multiple previous versions is required to retrieve the incremental updates corresponding to each previous version across which the information is to be rolled back. In some cases the amount of changes across versions can be large, which can result in a large amount of information being communicated across network and a large resulting requirement for bandwidth consumption and/or time, even if the net change between the current version and the desired version is relatively small.

Accordingly, to provide increased efficiency and lower time and bandwidth consumption requirements in connection with a restore from remotely stored backup information, system 100 can facilitate differential restoration of information. More particularly, when a user desires to restore a previous version of one or more files, a differential component 110 can be utilized to conduct a differential between the desired version and a current version presently stored by the user machine. In accordance with one aspect, instead of reversing an incremental differential update process used over the lifetime of the file(s) and all associated backups, differential component 110 can instead utilize a set of signatures and/or other indicators to determine only the unique segments or blocks that are present between the desired version and the current version without requiring reversal of any incremental processes.

In accordance with another aspect, upon identifying a list of unique blocks between a current file version and a desired version, a block location component 120 can be utilized to identify respective locations of the unique blocks on an associated network. Thus, can be appreciated that by identifying, locating, and/or retrieving only blocks or segments of a file determined to have changed from the desired version of a given file to its current version, the restore process conducted by system 100 can provide reduced latency and bandwidth requirements and increased performance over traditional online backup solutions.

In one example, block location component 120 can utilize a map, index, and/or other metadata relating to locations of respective blocks on an associated network to retrieve respective blocks determined to be different between the current and desired file versions. In another example, block location component 120 can locate blocks in an intelligent and/or automated manner to discover a path of least resistance for obtaining respective blocks. Thus, for example, block location component 120 can utilize factors such as network availability, loading, or the like, to determine a most efficient manner for obtaining file segments or blocks. By way of specific example, block location component 120 can determine that a given block is located both at a cloud storage location on the Internet and at one or more peer machines associated with a local network. In such an example, block location component 120 can facilitate retrieval of the block from the nearest available peer to facilitate faster retrieval and conserve network bandwidth, falling back to the cloud only if no peers are available. Examples of implementations that can be utilized for a peer-to-peer and/or cloud based storage architecture are provided in further detail infra.

In accordance with an additional aspect, after block location component 120 identifies locations of respective unique blocks corresponding to a given file, a restore component 130 can be utilized to pull the identified blocks from the locations given by block location component 120 and to restore the desired version of the file based on the retrieved blocks. In one example, locations at which restore component 130 retrieves respective identified blocks can be set by block location component 120. Alternatively, block location component 120 can provide a list of locations at which one or more given blocks are located, based on which restore component 130 can select a location from which to retrieve the block(s) in an automated manner based on availability, loading, bandwidth considerations, and/or other suitable factors. For example, block location component 120 can provide restore component 130 with one or more peers at which given blocks are located as well as a corresponding location on a cloud storage system on the Internet, and restore component 130 can retrieve block(s) with an emphasis on utilizing peer machines when practicable to conserve bandwidth and reduce latency.

After identified blocks corresponding to a desired version of a file have been retrieved by restore component 130, restore component 130 can recreate the desired version of the file by merging the retrieved blocks with the non-unique blocks already locally present in the current version of the file. Recreation of the desired version of a file can be performed using, for example, a reverse difference algorithm in which changes in the current version over the desired version are rolled back using obtained blocks that correspond to differences between the current version of the file and the desired version. It should be appreciated, however, that file restoration can be performed by restore component 130 using any suitable algorithm for merging a current file version with unique file segments associated with a desired file version. Further, it should be appreciated that the construction, identification, and/or use of blocks or file segments can be performed by system 100 in any suitable manner and that unless explicitly stated otherwise, the hereto appended claims are not intended to be limited to any specific example of file segmentation or restoration.

Figure 2:
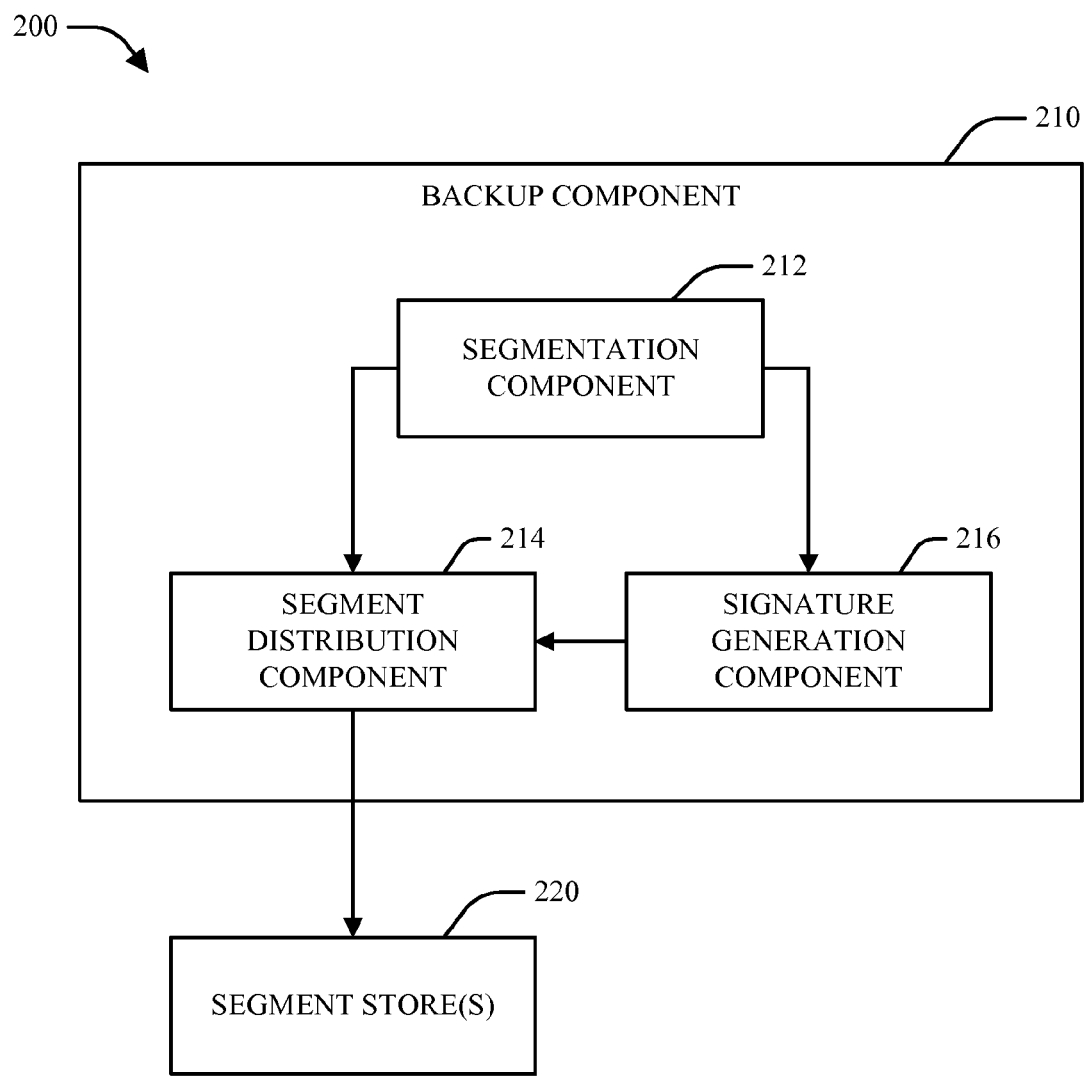
FIG. 2 is a block diagram of a system for generating backup information in accordance with various aspects.

Turning now to FIG. 2, a system 200 for generating backup information in accordance with various aspects is illustrated. As FIG. 2 illustrates, system 200 can include a backup component 210, which can generate and facilitate storage of backup copies of files, system snapshots, and/or other information associated with a backup client machine. In one example, backup component 210 can reside on and/or operate from a machine on which the client information to be backed up is located. Additionally or alternatively, backup component 210 can reside on a disparate computing device (e.g., as a remotely executed component). In one example, backup component 210 can be utilized to back up a set of files and/or other information at a regular interval in time, upon the triggering of one or more events (e.g., modification of a file), and/or based on any other suitable activating criteria.

Figure 3:
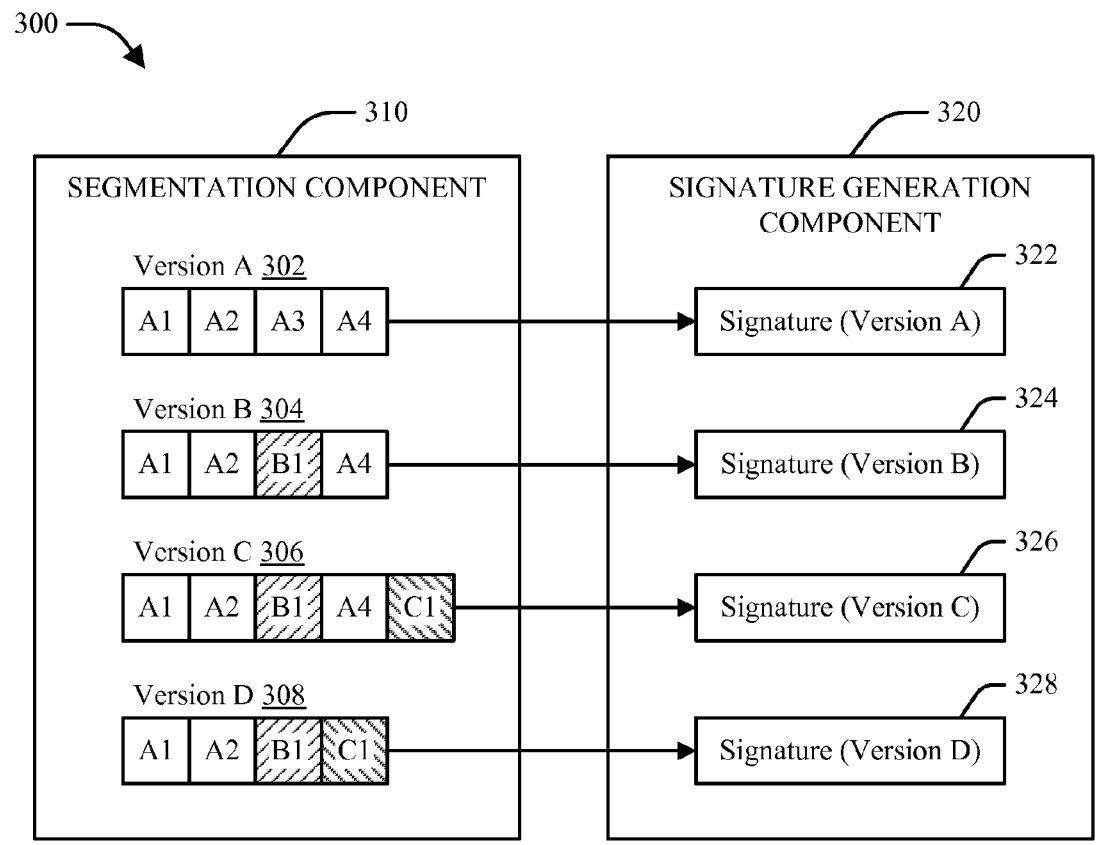
FIG. 3 is a block diagram of a system for generating signatures corresponding to backup information in accordance with various aspects.

In accordance with one aspect, backup of a file can be conducted in an incremental manner by backup component 210 in order to reduce the amount of bandwidth and/or storage space required for implementing system 200. This can be accomplished by, for example, first dividing a file to be backed up into respective file segments (e.g., blocks, chunks, etc.) using a segmentation component 212. In one example, segmentation or chunking of a file can be performed by segmentation component 212 in a manner that facilitates de-duplication of respective file segments. For example, in a specific, non-limiting example illustrated by system 300 in FIG. 3, a segmentation component 310 can divide a first version of a file (e.g., Version A 302) into a set of uniform and/or non-uniform blocks, denoted in FIG. 3 as A1 through A4. Subsequently, upon detecting a modification to the file (e.g., to Version B 304), segmentation component 310 can re-segment the file in a manner consistent with the segmentation of Version A 302 such that any blocks in the file that differ in state from Version A 302 to Version B 304 are readily identifiable. For example, as illustrated in FIG. 3, Version B 304 contains one block, denoted in Version B 304 as B1, that has changed from Version A 302 to Version B 304.

Upon detection of unique blocks in an updated version of a file, segmentation component 310 (and, similarly, segmentation component 212 in system 200) can facilitate incremental storage of new and/or changed blocks corresponding to a file as well as other information relating to changes between respective versions of the file. As system 300 further illustrates, these updates, referred to generally herein as incremental or delta updates, can also be performed to facilitate storage of information relating to the addition of new file blocks (e.g., an addition of block C1 in Version C 306), removal of file blocks (e.g. a deletion of block A4 in Version D 308), and/or any other suitable file operation and/or modification.

Returning to system 200 in FIG. 2, upon generation of blocks or segments corresponding to a file, various blocks corresponding to respective files and/or file updates can be provided to a segment distribution component 214. Segment distribution component 214 can, in turn, distribute the blocks among one or more segment stores 220 at one or more network storage locations. Segment stores 220 can be associated with, for example, peer machines in a local network, a cloud storage service and/or another suitable Internet-based storage location, and/or any other storage site. Techniques for distributing information among network storage locations are described in further detail infra.

In accordance with one aspect, a signature generation component 216 can additionally be employed by backup component 210 to generate signature information corresponding to one or more files and/or versions thereof as segmented by the segmentation component 212. For example, as illustrated by diagram 300 in FIG. 3, a signature generation component 320 can be utilized to generate respective signatures 322-328 corresponding to respective versions 302-308 of a particular file. Additionally or alternatively, signatures generated by signature generation component 216 can correspond to single blocks, groups of blocks (e.g., blocks in a file and/or an incremental update to a file), entire files and/or file versions, and/or any other suitable grouping. By way of a specific, non-limiting example, respective blocks can be pre-configured to a uniform size (e.g., 4 kilobytes (kb)), and respective signatures can be configured to represent a predetermined uniform number of blocks (e.g., 12). It should be appreciated, however, that any suitable block size and/or signature structure can be utilized.

In one example, a signature created by signature generation component 216 can be utilized to identify the blocks or segments present in a given version of a file. Moreover, segmentation component 212 can be configured to perform segmentation consistently across respective versions of a file such that signatures generated for respective versions of a file indicate changes across the respective versions. Accordingly, a set of unique blocks between a current version of a file and a desired version can be identified as illustrated by system 400 in FIG. 4.

Figure 4:
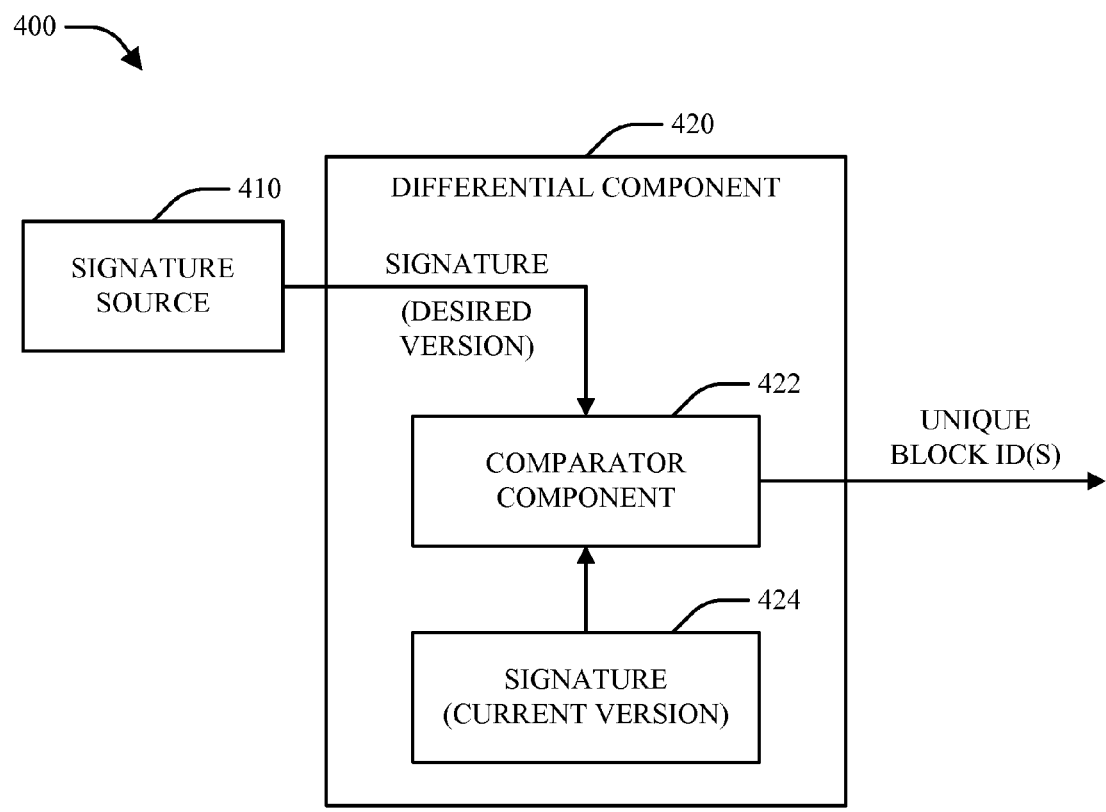
FIG. 4 is a block diagram of a system for performing a signature-based differential in accordance with various aspects.

As FIG. 4 illustrates, a differential component 420 can have associated therewith and/or otherwise be configured to obtain a signature 424 corresponding to a current version of a file to be restored. Upon determining that it is desired to restore the file back to a given previous version, a signature source 410 can provide a corresponding signature associated with the desired version. Based on the signatures associated with both versions, a comparator component 422 can then compare the respective signatures to obtain the identities of blocks that are unique between the desired version and the current version. Thus, it can be appreciated that, in one example, comparator component 422 can perform a signature-based differential to determine the identities of respective unique blocks that are required for a successful restore of a given file. In another example, signature source 410 can be associated with a device to which differential component 420 is associated and/or another suitable device (e.g., a cloud service provider, a peer or super-peer, etc.). By way of a non-limiting example, signature source 410 can be implemented as a version listing index that tracks respective versions of information in an associated system and their corresponding signatures. In one example, such an index can be distributed over a plurality of network locations, such as peers, super peers, or cloud storage locations in the associated system. It should be appreciated, however, that such an implementation is merely an example of an implementation that can be utilized and that, unless explicitly stated otherwise, the hereto appended claims are not intended to be limited to such an implementation.

Figure 5:
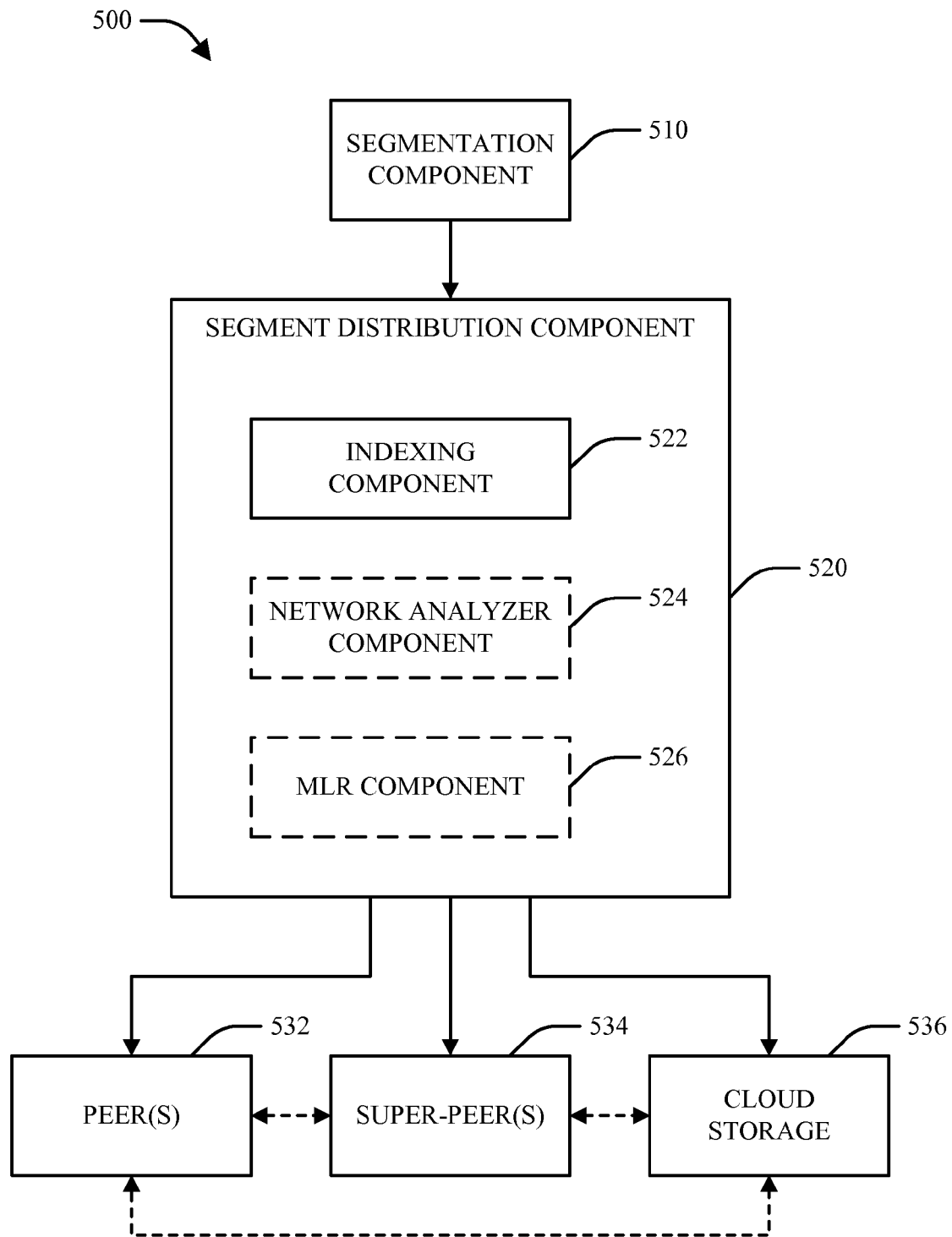
FIG. 5 is a block diagram of a system for implementing hybrid cloud-based and peer-to-peer backup storage in accordance with various aspects.

Turning now to FIG. 5, a block diagram of a system 500 for implementing hybrid cloud-based and peer-to-peer backup storage in accordance with various aspects is illustrated. As FIG. 5 illustrates, system 500 can include a segmentation component 510, which can generate file segments or blocks corresponding to a file and/or respective versions thereof as described above. In one example, blocks generated by segmentation component 510 can be provided to a segment distribution component 520, which can provide respective blocks to one or more associated storage locations.

In accordance with one aspect, a hybrid peer-to-peer (P2P) and cloud-based architecture can be utilized by system 500, such that segment distribution component 520 can make pieces of data utilized for conducting a restore operation and/or signatures relating thereto available at one or more trusted peers, such as peer(s) 532 and/or super-peer(s) 534, as well as at one or more cloud storage locations 536. As further illustrated in system 500, peer(s) 532, super-peer(s) 534, and/or cloud storage 536 can be further operable to communicate file segments, signatures, and/or other information between each other. In addition, it can be appreciated that segmentation component 510, segment distribution component 520, and/or any other components of system 500 could additionally be associated with one or more peers 532, super-peers 534, or entities associated with cloud storage 536. Further detail regarding techniques by which peer(s) 532, super-peer(s) 534, and cloud storage 536 can be utilized, as well as further detail regarding the function of such entities within a hybrid architecture, is provided infra.

In accordance with another aspect, segment distribution component 520 can include and/or otherwise be associated with an indexing component 522, which can maintain an index that lists respective mapping relationships between blocks generated by segmentation component 510 and corresponding locations to which the blocks have been distributed. In one example, this index can be distributed along with blocks represented therein to one or more peers 532, super-peers 534, or cloud storage locations 536. It can be appreciated that an entire index can be distributed to one or more locations, or that an index can itself be segmented and distributed among multiple locations.

In accordance with an additional aspect, segment distribution component 520 can further optionally include a network analyzer component 524, which can analyze a computing network associated with system 500 to determine one or more locations to distribute respective blocks, indexes, index segments, or the like. In one example, network analyzer component 524 can select one or more destinations for information to be distributed based on network loading, availability of storage locations (e.g., based on device activity levels, powered-on or powered-off status, available storage space at respective locations, etc.), or the like. This can be done, for example, to balance availability of various data with optimal locality.

As system 500 further illustrates, a machine learning and reasoning (MLR) component 526 can additionally be employed by network analyzer component 524 to facilitate intelligent, automated selection of storage locations for respective information. In one example, MLR component 526 can utilize any suitable artificial intelligence (AI), machine learning, and/or other algorithm(s) generally known in the art. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g. hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 6:
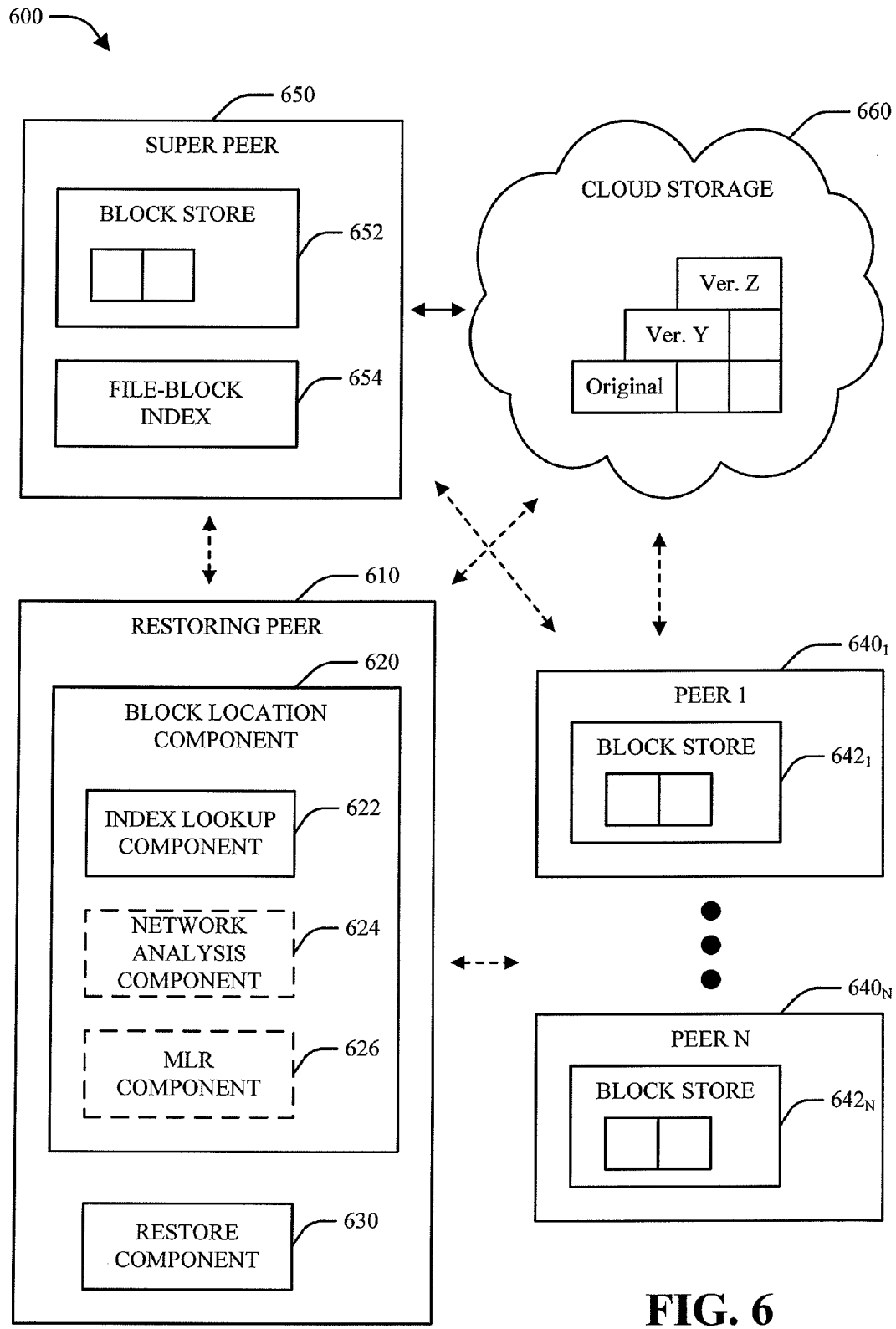
FIG. 6 is a block diagram of a system for conducting a differential restore in a hybrid cloud-based and peer-to-peer backup architecture in accordance with various aspects.

Referring to FIG. 6, a system 600 for conducting a differential restore in a hybrid cloud-based and peer-to-peer backup architecture in accordance with various aspects is illustrated. As system 600 illustrates, a hybrid P2P/cloud backup architecture can be utilized, wherein backup data corresponding to one or more computing devices is distributed among one or more peer machines 610 or 640 and/or one or more super peer machines 650, as well as one or more cloud storage locations 660.

In one example, peer machines 640 can include respective block stores 642, which can be utilized to receive and maintain a set of blocks corresponding to one or more files or delta updates to respective files. Files and/or updates thereto can be associated with, for example, a restoring peer 610 (e.g., as created by a segmentation component 510 and distributed by a segment distribution component 520). In addition, although not illustrated in system 600, a restoring peer 610 can additionally or alternatively include a block store for locally storing one or more blocks corresponding to files and/or delta updates of files residing locally at restoring peer 610.

In another example, one or more super peers 650 in system 600 can additionally include a block store 652 as well as a file-block index 654, which can provide a master listing of file blocks stored within system 600 and their respective locations (e.g., as created by an indexing component 522). Although file-block index 654 is illustrated as located at super peer 650 in system 600, it should be appreciated that some or all of file block index 654 could additionally or alternatively be located at one or more peers 610 and/or 640 as well as at cloud storage 660.

In accordance with one aspect, upon identifying that a restore from a version of information residing at a restoring peer 610 to a previous version is desired, a signature-based differential can be conducted between the version residing at the restoring peer 610 and the desired version to determine identities of one or more blocks that do not match between the versions, in accordance with various aspects described above. Following signature comparison, a block location component 620 can utilize an index lookup component 622 to obtain metadata from file-block index 654 and/or any other suitable source that points to the respective locations of blocks determined to be unique between the version of the information to be restored as located at restoring peer 610 and the desired version.

Based on the locations obtained by index lookup component 622, block location component 620 and/or a restore component 630 can pull the unique blocks from their corresponding locations within block store(s) 642 or 652, block storage 662, and/or any other suitable storage location within system 600. Once obtained, the blocks can then be merged with the non-unique blocks already present in the current version of the information to be restored to recreate the desired version. Accordingly, in one example, by conducting a signature-based differential between a current file version and a file version to be restored, a restore can be conducted by pulling only the bits or blocks that differ between the versions independently of incremental updates. In one example, it can be determined (e.g., by index lookup component 622 or otherwise) that one or more blocks are already locally present at restoring peer 610 (e.g., due to the blocks being part of one or more other files at restoring peer 610). In such a case, the determined local blocks can be utilized instead of pulling the blocks from one or more other locations in system 600.

Thus, by way of specific example illustrated at cloud storage 660, respective versions of a file, noted as the Original version and subsequent versions Y and Z, can be stored along with incremental updates between consecutive versions (e.g., Original and Y, Y and Z, etc.). Subsequently, if a user desires to restore the Original version of the file from Version Z, a signature-based differential can be utilized to pull only the blocks that are unique between the Original version and Version Z without requiring a full reversal of the incremental updates between the Original version and Version Y and between Version Y and Version Z or downloading of the entireties of such updates.

In another example, the hybrid P2P/cloud backup architecture of system 600 can be exploited to minimize latency and/or bandwidth required to restore one or more files at a restoring peer 610. For example, block location component 620 can utilize a network analysis component 624, which can analyze system 600 and facilitate pulling of respective file segments from the path of least resistance through system 600. Thus, for example, in the event that a given block resides at a block store 642 or 652 at a peer 640 or super peer 650 as well as in cloud storage 660, preference can be given to pulling the block from the nearest network nodes first. As a result, a peer 640 and/or super peer 650 can be prioritized over cloud storage 660 to minimize the latency and bandwidth usage associated with communicating with cloud storage 660.

Additionally or alternatively, network analysis component 624 can analyze availability of respective nodes in system 600, relative network loading, and/or other factors to facilitate intelligent selection of nodes from which to obtain respective blocks. Accordingly, a restoring peer 610 can be configured to first attempt to obtain a set of blocks from a peer machine 640 or a super peer 650, falling back on cloud storage 660 only if no peers 640 and/or 650 with required block(s) are available. In another example, an MLR component 626 can be utilized to facilitate automation of the process of selecting a network node from which to obtain blocks.

In an alternative example, while network analysis component 624 is illustrated in system 600 as associated with a restoring peer 610, it can be appreciated that a super peer 650 and/or another entity from which a restoring peer 610 accesses a file-block index 654 can utilize similar network analysis in order to select an optimal location for respective blocks from among a plurality of locations for the respective blocks indicated by the file-block index 654. Once selected, such location(s) can be subsequently provided to a restoring peer 610.

In accordance with one aspect, upon obtaining the unique blocks required for restoring one or more files to a desired version, restore component 630 at restoring peer 610 can be utilized to merge the obtained unique blocks with the non-unique blocks already locally present in the current version of the file(s), thereby restoring the file(s) to the desired version. By way of specific, non-limiting example, a reverse difference algorithm can be utilized by restore component 630, wherein one or more noted differences between the current version and the desired version are subtracted from the current version in order to roll back to the desired version. Such subtraction can be based on signatures or hashes corresponding to the respective file versions and/or any other suitable information relating to the respective file versions. It should be appreciated, however, that such an algorithm is merely an example of a restoration technique that could be utilized, and that any other restoration algorithm could be used in addition to or in place of such an algorithm.

Figure 7:
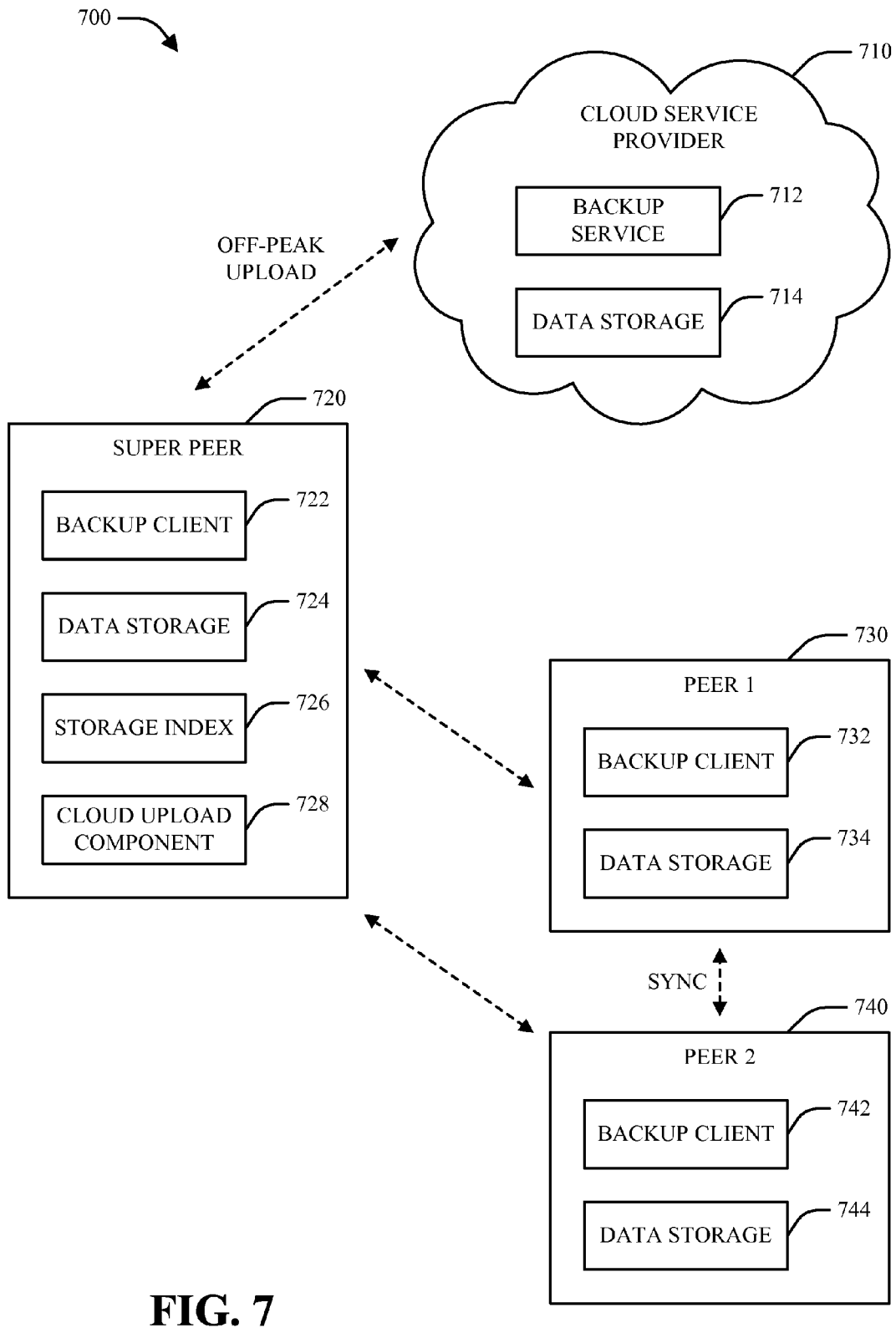
FIG. 7 illustrates an example network implementation that can be utilized in connection with various aspects described herein.

Referring next to FIG. 7, a diagram 700 is provided that illustrates an example network implementation that can be utilized in connection with various aspects described herein. As diagram 700 illustrates, a network implementation can utilize a hybrid peer-to-peer and cloud-based structure, wherein a cloud service provider 710 interacts with one or more super peers 720 and one or more peers 730-740.

In accordance with one aspect, cloud service provider 710 can be utilized to remotely implement one or more computing services from a given location on a network/internetwork associated with super peer(s) 720 and/or peer(s) 730-740 (e.g., the Internet). Cloud service provider 710 can originate from one location, or alternatively cloud service provider 710 can be implemented as a distributed Internet-based service provider. In one example, cloud service provider 710 can be utilized to provide backup functionality to one or more peers 720-740 associated with cloud service provider 710. Accordingly, cloud service provider 710 can implement a backup service 712 and/or provide associated data storage 714.

In one example, data storage 714 can interact with a backup client 722 at super peer 720 and/or backup clients 732 or 742 at respective peers 730 or 740 to serve as a central storage location for data residing at the respective peer entities 720-740. In this manner, cloud service provider 710, through data storage 714, can effectively serve as an online "safe-deposit box" for data located at peers 720-740. It can be appreciated that backup can be conducted for any suitable type(s) of information, such as files (e.g., documents, photos, audio, video, etc.), system information, or the like. Additionally or alternatively, distributed network storage can be implemented, such that super peer 720 and/or peers 730-740 are also configured to include respective data storage 724, 734, and/or 744 for backup data associated with one or more machines on the associated local network. In another example, techniques such as de-duplication, incremental storage, and/or other suitable techniques can be utilized to reduce the amount of storage space required by data storage 714, 724, 734, and/or 744 at one or more corresponding entities in the network represented by diagram 700 for implementing a cloud-based backup service.

In accordance with another aspect, cloud service provider 710 can interact with one or more peer machines 720, 730, and/or 740. As illustrated in diagram 700, one or more peers 720 can be designated as a super peer and can serve as a liaison between cloud service provider 710 and one or more other peers 730-740 in an associated local network. While not illustrated in FIG. 7, it should be appreciated that any suitable peer 730 and/or 740, as well as designated super peer(s) 720, can directly interact with cloud service provider 710 as deemed appropriate. Thus, it can be appreciated that cloud service provider 710, super peer(s) 720, and/or peers 730 or 740 can communicate with each other at any suitable time to synchronize files or other information between the respective entities illustrated by diagram 700.

In one example, super peer 720 can be a central entity on a network associated with peers 720-740, such as a content distribution network (CDN), an enterprise server, a home server, and/or any other suitable computing device(s) determined to have the capability for acting as a super peer in the manners described herein. In addition to standard peer functionality, super peer(s) 720 can be responsible for collecting, distributing, and/or indexing data among peers 720-740 in the local network. For example, super peer 720 can maintain a storage index 726, which can include the identities of respective files and/or file segments corresponding to peers 720-740 as well as pointer(s) to respective location(s) in the network and/or in cloud data storage 714 where the files or segments thereof can be found. Additionally or alternatively, super peer 720 can act as a gateway between other peers 730-740 and a cloud service provider 710 by, for example, uploading respective data to the cloud service provider 710 at designated off-peak periods via a cloud upload component 728. In another example, super peer 720 can serve as a cache for "hot" or "cold" data, such that the data that is most likely to be restored has a copy located closer to the restoring or originating peer and, over time, more copies are distributed to "colder" parts of the distributed system (e.g. data storage 714 at cloud service provider 710).

Figure 8:
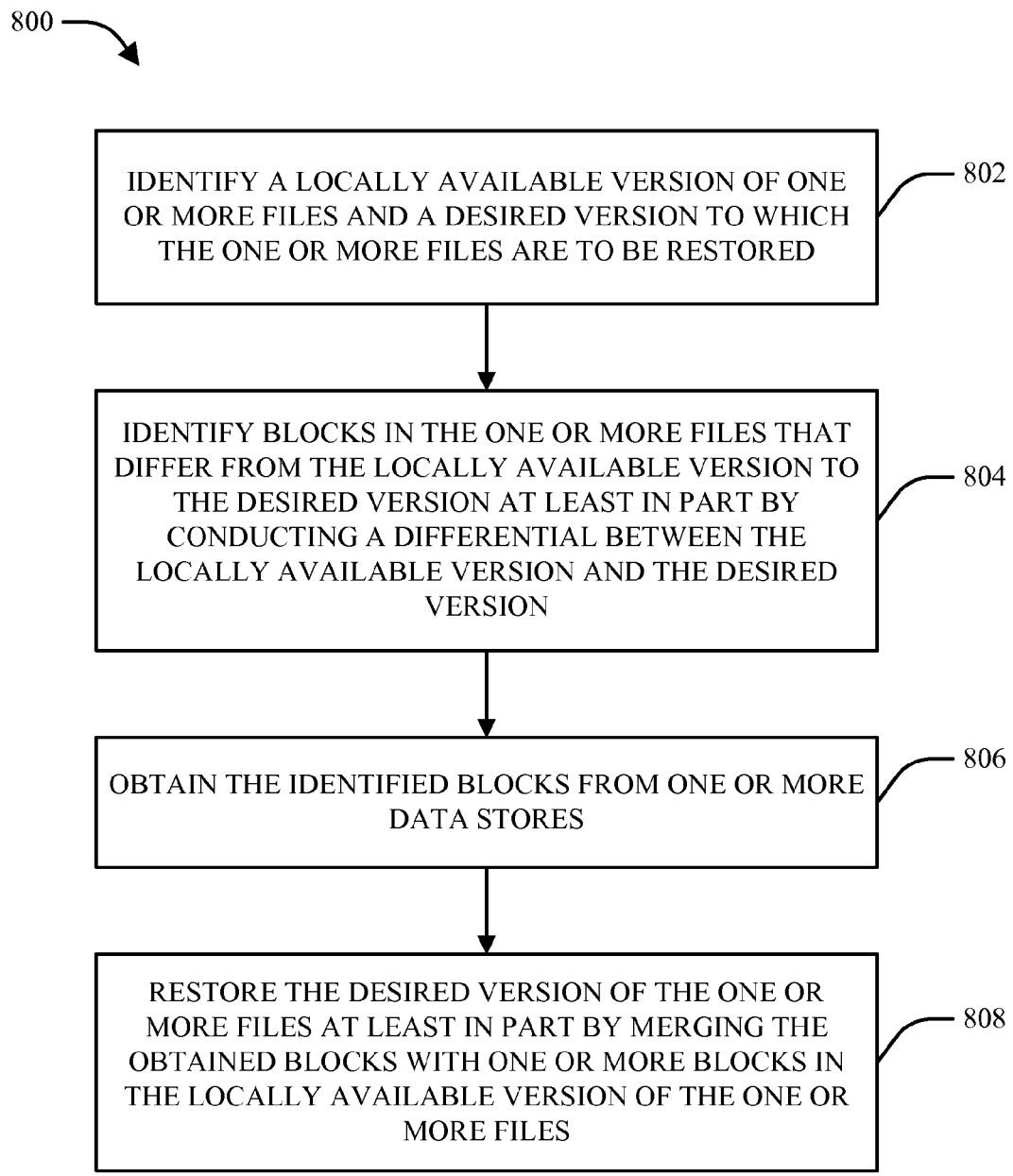
FIG. 8 is a flowchart of a method for performing a differential file restore.
Figure 9:
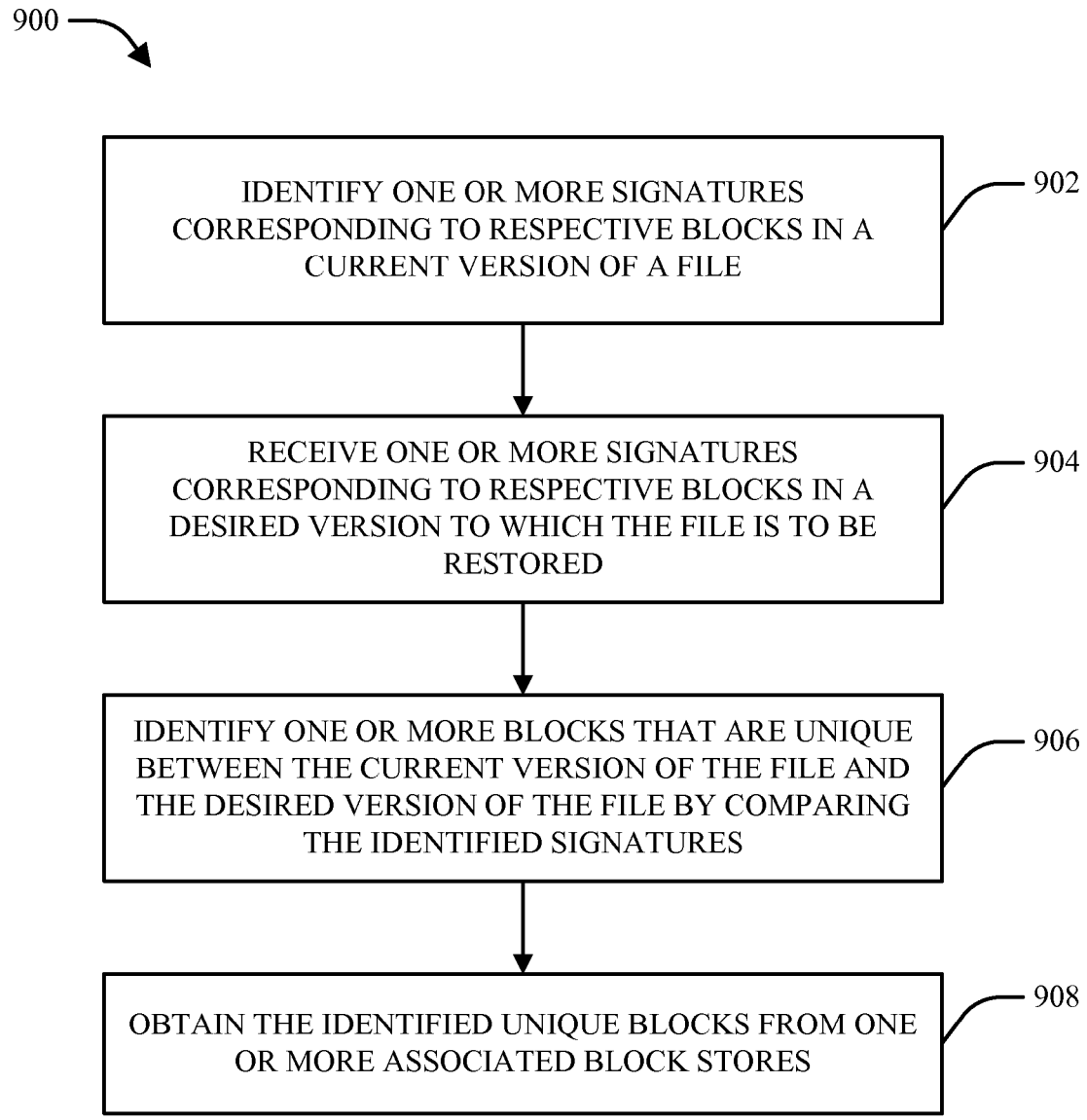
FIG. 9 is a flowchart of a method for conducting a signature-based differential of a file.
Figure 10:
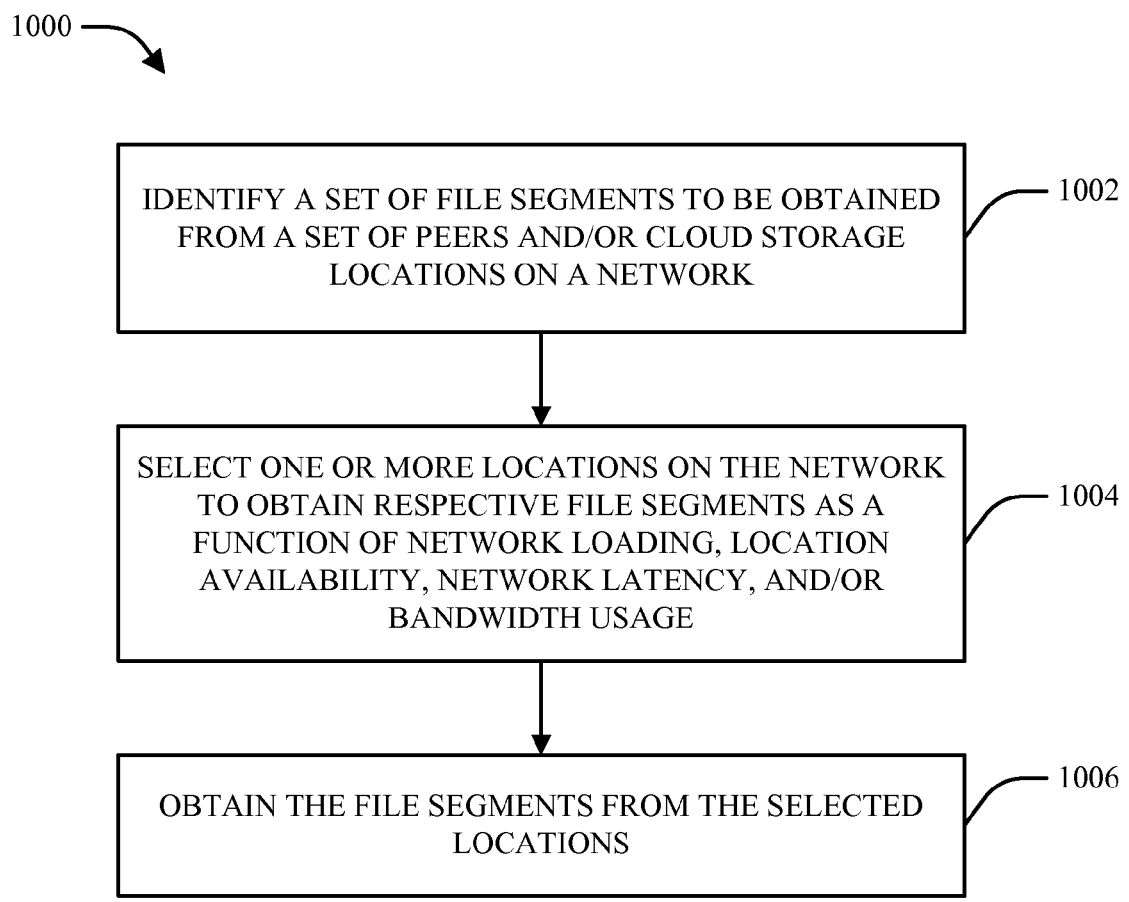
FIG. 10 is a flowchart of a method for obtaining file segments from a hybrid peer-to-peer/cloud-based system.

Turning to FIGS. 8-10, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 8, a method 800 of performing a differential file restore is illustrated. At 802, a locally available version of one or more files and a desired version to which the one or more files are to be restored are identified. At 804, blocks in the one or more files identified at 802 are identified that differ from the locally available version to the desired version. The identification at 804 is done at least in part by conducting a differential between the locally available version and the desired version (e.g., using a differential component 110). At 806, the blocks identified at 804 are obtained (e.g., by a block location component 120 and/or a restore component 130) from one or more data stores (e.g., peers 532, super-peers 534, and/or cloud storage 536). At 808, the desired version of the one or more files identified at 802 is restored at least in part by merging the blocks obtained at 806 with one or more blocks in the locally available version of the one or more files.

Referring now to FIG. 9, a flowchart of a method 900 for conducting a signature-based differential of a file is provided. At 902, one or more signatures (e.g., signature 424) corresponding to respective blocks in a current version of a file are identified. At 904, one or more signatures are received (e.g., from a signature source 410) that correspond to respective blocks in a desired version to which the file identified at 902 is to be restored. At 906, one or more blocks that are unique between the current version of the file and the desired version of the file are identified by comparing the signatures identified at 902 and 904 (e.g., via a comparator component 422). At 908, the unique blocks identified at 906 are obtained from one or more associated block stores.

FIG. 10 illustrates a method 1000 for obtaining file segments from a hybrid peer-to-peer/cloud-based system. At 1002, a set of file segments to be obtained from a set of peers (e.g., peers 610 or 640 and/or super peer 650) and/or cloud storage locations (e.g., cloud storage 660) on a network is identified. At 1004, one or more locations on the network to obtain respective file segments are selected (e.g., by a block location component 620) as a function of network loading, location availability, network latency, and/or bandwidth usage (e.g., as determined by a network analysis component 624). At 1006, the file segments are obtained from the locations selected at 1004.

Figure 11:
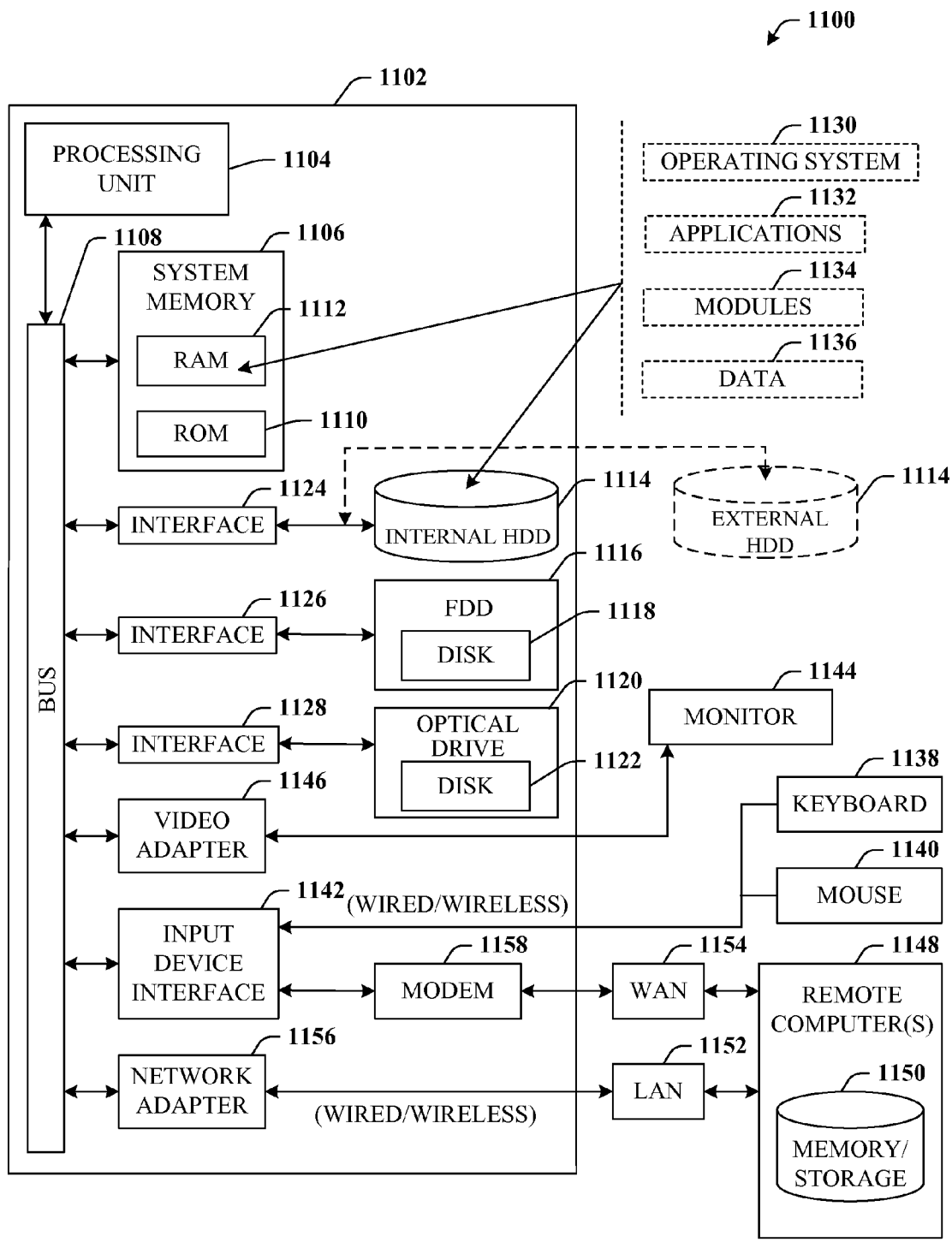
FIG. 11 is a block diagram of a computing system in which various aspects described herein can function.

In order to provide additional context for various aspects described herein, FIG. 11 and the following discussion are intended to provide a brief, general description of a suitable computing environment 1100 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, an exemplary environment 1100 for implementing various aspects described herein includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, a serial port, an IEEE-1394 port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

Figure 12:
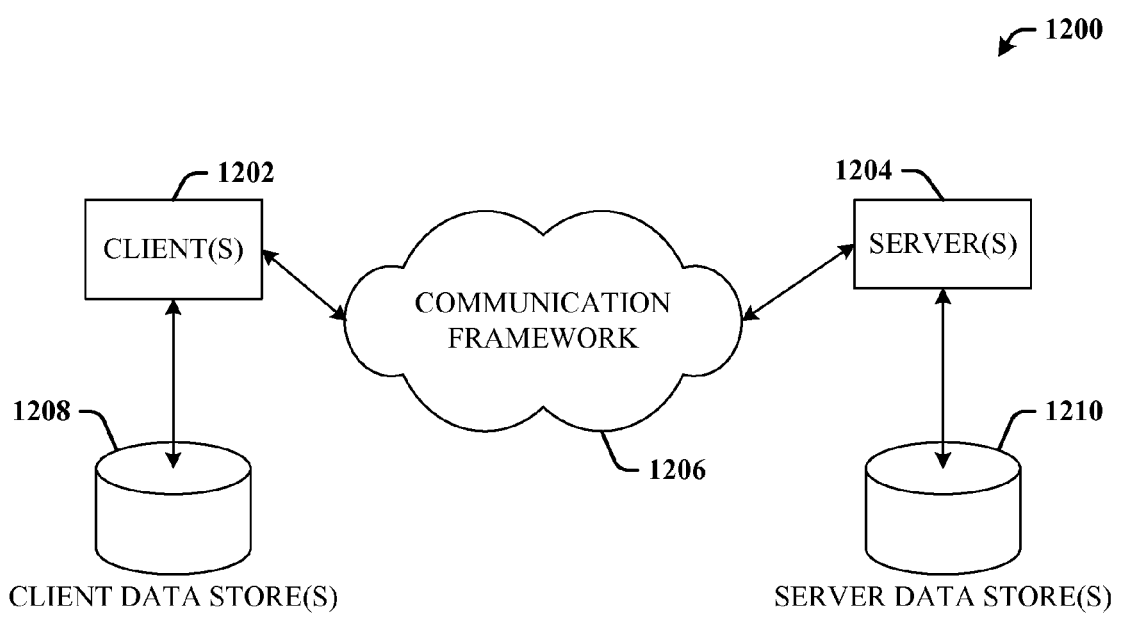
FIG. 12 illustrates a schematic block diagram of an example networked computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g. threads, processes, computing devices). In one example, the client(s) 1202 can house cookie(s) and/or associated contextual information by employing one or more features described herein.

The system 1200 also includes one or more server(s) 1204. The server(s) 1204 can also be hardware and/or software (e.g., threads, processes, computing devices). In one example, the servers 1204 can house threads to perform transformations by employing one or more features described herein. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g. a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A client system for restoring information from a network backup system, comprising:
 a memory and a processor that are respectively configured to store and execute instructions, including instructions organized into:
  a differential component that is configured to identify, for a data item to be restored, one or more portions of the data item that are different between a current version of the data item and a target version of the data item based on both a first differential, calculated at the client system, between the current version of the data item and the target version of the data item and on a second differential, calculated at a backup location that is remote from the client system, between the current version of the data item and the target version of the data item;

a location determination component that is configured to determine a plurality of network locations at which the one or more identified portions are stored and to select one of the determined network locations, wherein the plurality of network locations includes at least one location associated with a cloud service provider; and a restore component that is configured to retrieve the one or more identified portions from the selected location and to restore the current version of the data item to the target version of the data item with the retrieved one or more identified portions.

2. The system of claim 1, wherein the differential component is further configured to identify the one or more portions at least in part by comparing respective portion signatures associated with the portions of the current version of the data item to respective portion signatures associated with corresponding portions of the target version of the data item.

3. The system of claim 1, wherein the location determination component comprises an index lookup component that is configured to look up the plurality of network locations from an index that is at a predetermined network location.

4. The system of claim 3, wherein the index comprises a listing of the one or more portions of the data item and pointers to at least one location for each of the one or more portions.

5. The system of claim 1, wherein the plurality of network locations also includes:

a location of a remote device connected to the client system via a wide area network; and at least one of:

a location of a local peer device is that connected to the client system via a local area network and is that configured to store the one or more portions of the data item; and a location of a local super peer device that is connected to the client system via the local area network and that is configured to store the one or more portions of the data item as well as an index that includes a listing of the one or more portions and pointers to at least one location for each of the one or more portions.

6. The system of claim 5, wherein the location determination component is further configured to select one of the determined network locations based at least in part on prioritizing the location of the local peer device or super peer device over the location of the remote device.

7. The system of claim 1, wherein the location determination component comprises a network analysis component that is configured to select one of the determined network locations based at least in part on network loading, network location uptime, proximity of the respective network locations to the client system, and expected bandwidth consumption for retrieving the identified portions from the respective network locations.

8. The system of claim 1, wherein devices at each of the plurality of network locations are configured to store the data items and one or more incremental updates to the data items.

9. The system of claim 1, wherein the restore component is further configured to restore the target version of the data item by merging the retrieved portions with one or more portions of the current version of the data item.

10. The system of claim 9, wherein the restore component is further configured to merge the retrieved portions with one or more portions of the current version of the data item at least in part by replacing one or more portions of the current version of the data item with corresponding portions of the target version of the data item.

11. The system of claim 1, wherein the data item to be restored is a system image.

12. A method of performing a differential restore of one or more files, comprising:

identifying a locally available version of a file stored on at least one memory of a computing device;

identifying a target version of the file to which the locally available version of the file is to be restored to;

identifying, by the computing device, respective segments of the target version of the file that differ from corresponding segments of the locally available version of the file based on calculations performed by at least both of the computing device and by a backup server computing device that is remote from the computing device;

obtaining each identified segment, including for each identified segment:

determining a plurality of network data stores from which the identified segment can be retrieved, the plurality of network data stores including at least one network data store of a cloud service provider;

selecting one network data store from the plurality of determined network data stores; and obtaining, by the computing device, the identified segment from the selected network data store; and restoring, by the computing device, the target version of the file from the current version of the file and from the identified and obtained segments.

13. The method of claim 12, wherein the identifying the respective segments comprises:

comparing signatures associated with segments of the target version of the file to signatures associated with corresponding segments of the locally available version of the file.

14. The method of claim 12, wherein the obtaining each identified segment further comprises:

obtaining a first identified segment from a first network data store; and obtaining a second identified segment from a second network data store, wherein the first network data store is different than the second network data store.

15. The method of claim 12, wherein the network data stores includes:

a cloud-based network data store of the cloud service provider, the cloud-based network data store being connected to the computing device via a wide area network;

a local peer network data store that is connected to the computing device via a local area network and that is configured to store backup segments; and a local super peer network data store that is connected to the computing device via the local area network and that is configured to store the backup segments as well as an index that includes a listing of the backup segments and pointers to the network data stores from which the backup segments can be retrieved.

16. The method of claim 15, wherein the selecting one network data store comprises:

applying a first preference level to the local peer network data store and the local super peer network data store; and applying a second preference level to the cloud-based network data store, wherein the first preference level is indicative of a preference over the second preference level.

17. The method of claim 15, wherein the selecting one network data store comprises selecting the one network data store based at least in part on at least one of network loading between the computing device and the network data stores, availability of the network data stores, and anticipated bandwidth consumption associated with retrieving the identified segment from the cloud-based network data store.

18. The method of claim 12, wherein the restoring comprises merging the obtained segments of the target version of the file with segments of the locally available version of the file.

19. The method of claim 12, wherein the file is a portion of a system image or the system image.

20. An apparatus for restoring information from a hybrid peer-to-peer/cloud-based backup system, the apparatus comprising:
- means for conducting a signature-based comparison between blocks of a locally available version of a file and corresponding blocks of a target version of the file and for identifying at least one block of the target version of the file that does not identically correspond to any block of the locally available version of the file based on both the signature-based comparison and on another signature-based comparison that was calculated at a remote backup location;
- means for determining a plurality of network devices at which the at least one block of the target version of the file is available for retrieval and for selecting one of the determined plurality of network devices as a source for the at least one block of the target version of the file, wherein the plurality of network devices includes at least one device of a cloud service provider; and
- means for obtaining the at least one block of the target version of the file from the selected one of the determined plurality of network devices and for merging the at least one block of the target version of the file with one or more blocks of the locally available version of the file to restore the target version of the file.

* * * * *